US012581573B2

(12) United States Patent
Lindell et al.

(10) Patent No.: US 12,581,573 B2
(45) Date of Patent: Mar. 17, 2026

(54) COOKING DEVICE HAVING A MICROWAVE GENERATOR

(71) Applicant: Topinox Sarl, Wittenheim (FR)

(72) Inventors: Filip Lindell, Wittenheim (FR); Randolf Bergbauer, Wittenheim (FR); Ivan Feeney, Wittenheim (FR); Michael Prinzing, Wittenheim (FR)

(73) Assignee: TOPINOX SARL, Wittenheim (FR)

( * ) Notice: Subject to any disclaimer, the term of this patent is extended or adjusted under 35 U.S.C. 154(b) by 798 days.

(21) Appl. No.: 17/943,927

(22) Filed: Sep. 13, 2022

(65) Prior Publication Data

US 2023/0081316 A1 Mar. 16, 2023

(30) Foreign Application Priority Data

Sep. 15, 2021 (DE) ..................... 10 2021 123 920.6

(51) Int. Cl.
*H05B 6/64* (2006.01)
*F24C 7/02* (2006.01)
*F24C 7/08* (2006.01)
*H05B 6/68* (2006.01)

(52) U.S. Cl.
CPC ............. *H05B 6/6402* (2013.01); *F24C 7/02* (2013.01); *F24C 7/082* (2013.01)

(58) Field of Classification Search
CPC .......... F24C 14/005; F24C 7/02; F24C 7/082; H05B 6/6402
USPC ............... 219/756, 752, 753, 754, 755, 762; 99/443 R, DIG. 14
See application file for complete search history.

(56) References Cited

U.S. PATENT DOCUMENTS 5,804,800 A * 9/1998 Lee ...................... H05B 6/6411 219/754
5,892,209 A * 4/1999 Choi .................... H05B 6/6411 219/754

FOREIGN PATENT DOCUMENTS

DE 10325765 12/2004 ................ F24C 1/00
DE 102008014590 9/2009 .............. F24C 15/16

* cited by examiner

*Primary Examiner* — Quang T Van
(74) *Attorney, Agent, or Firm* — HAYES SOLOWAY P.C.

(57) ABSTRACT

A cooking device includes a microwave generator, a cooking chamber wall delimiting a cooking chamber, in which a through opening is provided, and a cooking chamber sieve associated with the through opening. At least one intermediate element is provided between the cooking chamber wall and the cooking chamber sieve, which serves to mount the cooking chamber sieve to the cooking chamber wall. The at least one intermediate element is configured such that the generation of electric arcs between the cooking chamber wall and the cooking chamber sieve is prevented.

20 Claims, 5 Drawing Sheets

COOKING DEVICE HAVING A MICROWAVE GENERATOR

The invention relates to a cooking device comprising a microwave generator, a cooking chamber wall delimiting a cooking chamber, in which a through opening is provided, and a cooking chamber sieve associated with the through opening.

BACKGROUND OF THE INVENTION

In particular, the cooking device is a cooking device for professional applications, such as those used in canteens, restaurants and large-scale catering. With such a cooking device, food can be cooked in a cooking chamber atmosphere, which may be hot air, steam or a cooking chamber atmosphere with adjustable humidity. Depending on the cooking program, it is possible to additionally or exclusively heat the food using microwave radiation.

The through opening can lead to a drainage system, by means of which it is possible to drain off impurities produced during the cooking process or cleaning liquid from the cooking chamber. The through opening is usually arranged in the bottom of the cooking chamber. The cooking chamber sieve is assigned to the through opening to prevent larger dirt particles from entering the drainage system through the through opening and possibly clogging it.

To enable the cooking chamber sieve to be cleaned quickly if necessary, it is detachably arranged at the through opening. In view of the thermal and chemical stresses to which the cooking chamber sieve is exposed, stainless steel is usually used as the material for the cooking chamber sieve.

Usually, the cooking chamber wall is also made of stainless steel. When microwave radiation is introduced into the cooking chamber, an electrical potential can build up between the cooking chamber sieve and the cooking chamber wall. Depending on the geometric conditions, the potential difference can discharge in the form of electric arcs between the cooking chamber sieve and the cooking chamber wall. Users of the cooking device may be irritated by such electric arcs. In addition, the electric arcs may damage the material of the cooking chamber sieve and/or the cooking chamber wall.

The object of the invention is to prevent electric arcs between the cooking chamber sieve and the cooking chamber wall, while still allowing the cooking chamber sieve to be quickly and easily removed from the cooking chamber drain, for example, for cleaning.

BRIEF DESCRIPTION OF THE INVENTION

To achieve this object, a cooking device is provided according to the invention, comprising a microwave generator, a cooking chamber wall delimiting a cooking chamber, in which a through opening is provided, and a cooking chamber sieve associated with the through opening, wherein at least one intermediate element is provided between the cooking chamber wall and the cooking chamber sieve, which serves to mount the cooking chamber sieve to the cooking chamber wall, and wherein the at least one intermediate element is configured such that the generation of electric arcs between the cooking chamber wall and the cooking chamber sieve is prevented. Due to the dual function (i.e. prevention of the generation of electric arcs between the cooking chamber sieve and the cooking chamber wall on the one hand and mounting of the cooking chamber sieve on the other hand), both requirements can be met reliably with little effort.

Advantageously, the at least one intermediate element produces a non-destructively detachable connection between the cooking chamber sieve and the cooking chamber wall. This makes it possible to remove the cooking chamber sieve if necessary to be able to clean it easily.

The at least one intermediate element may be arranged on the side of the cooking chamber sieve facing the cooking chamber wall above a cooking chamber sieve collar and may fill the area towards the cooking chamber wall. In this way, the intermediate element has good mechanical contact with both the cooking chamber sieve and the through opening.

Alternatively, at least two intermediate elements may be arranged on the side of the cooking chamber sieve facing the cooking chamber wall above the cooking chamber sieve collar, and an air gap may remain between the cooking chamber sieve and the cooking chamber wall. This has the advantage that less material is required for the manufacture of the intermediate elements and that individual intermediate elements are replaced if they are damaged. Again, the cooking chamber sieve does not contact the cooking chamber wall, as the assembly of the cooking chamber sieve takes place exclusively via the intermediate elements.

The at least one intermediate element may be provided, on the side facing the cooking chamber sieve, with at least one attachment means which engages in a recess provided in the cooking chamber sieve and locks the intermediate element to the cooking chamber sieve. The mechanical engagement ensures that the cooking chamber sieve is reliably locked in position and cannot come loose unintentionally.

The at least one intermediate element may have at least one latching means on the side facing the cooking chamber wall, which cooperates with a latching edge in the through opening of the cooking chamber wall, so that the cooking chamber sieve is positively locked. By means of such a latching means, the desired holding force for the cooking chamber sieve can be provided and it can be determined from which tensile force it can be detached from the through opening.

Alternatively, the at least one intermediate element may be configured as a spring element on the side facing the cooking chamber wall, so that the cooking chamber sieve is non-positively locked in the region of the through opening of the cooking chamber wall. The spring element can also be used to set how much force is required to lock or release the cooking chamber sieve in the through opening.

The at least one intermediate element may be configured to be electrically conductive and establish an electrical contact between the cooking chamber sieve and the cooking chamber wall. The electrical contact ensures a potential equalization, through which the current can flow through the intermediate element from one component to the other. Thus, it is ensured that no electric arcs can occur, as the electrical resistance between the two components via the intermediate element is significantly lower than that via an air gap between the two components.

Advantageously, the at least one intermediate element may have a meander spring and/or disk spring made of metal. These springs are particularly robust and durable as well as cost-effective and simple to manufacture. In addition, the spring elements can compensate for manufacturing tolerances and variations in component dimensions due to thermal influences.

Alternatively, the at least one intermediate element may be an electrical insulator and prevent an electrical potential equalization between the cooking chamber sieve and the cooking chamber wall. If the intermediate element is arranged on the side of the cooking chamber sieve facing the cooking chamber wall above the cooking chamber sieve collar and fills the area towards the cooking chamber wall, it completely insulates the transition. If several intermediate elements are arranged on the side of the cooking chamber sieve facing the cooking chamber wall above the sieve collar, the intermediate elements themselves and the air filling the air gap act as insulation. In both cases, potential equalization can thus be prevented. The size of the air gap is specified via the distance, which is determined by the intermediate element.

Alternatively, the at least one intermediate element may consist of a dielectric material. The dielectric material prevents a current flow between the cooking chamber wall and the cooking chamber sieve and prevents or reduces the generation of electric fields. This applies in particular to electric fields at the component edges, where field strength increases may occur due to the geometry.

In addition, the cooking chamber sieve and the through opening of the cooking chamber wall may be provided with radii to reduce the previously mentioned electric field strength increase at the component edges. This also helps to prevent undesired electric arcs.

BRIEF DESCRIPTION OF THE DRAWINGS

The invention is described below with reference to various examples shown in the accompanying drawings in which.

DETAILED DESCRIPTION OF THE INVENTION

Figure 1:
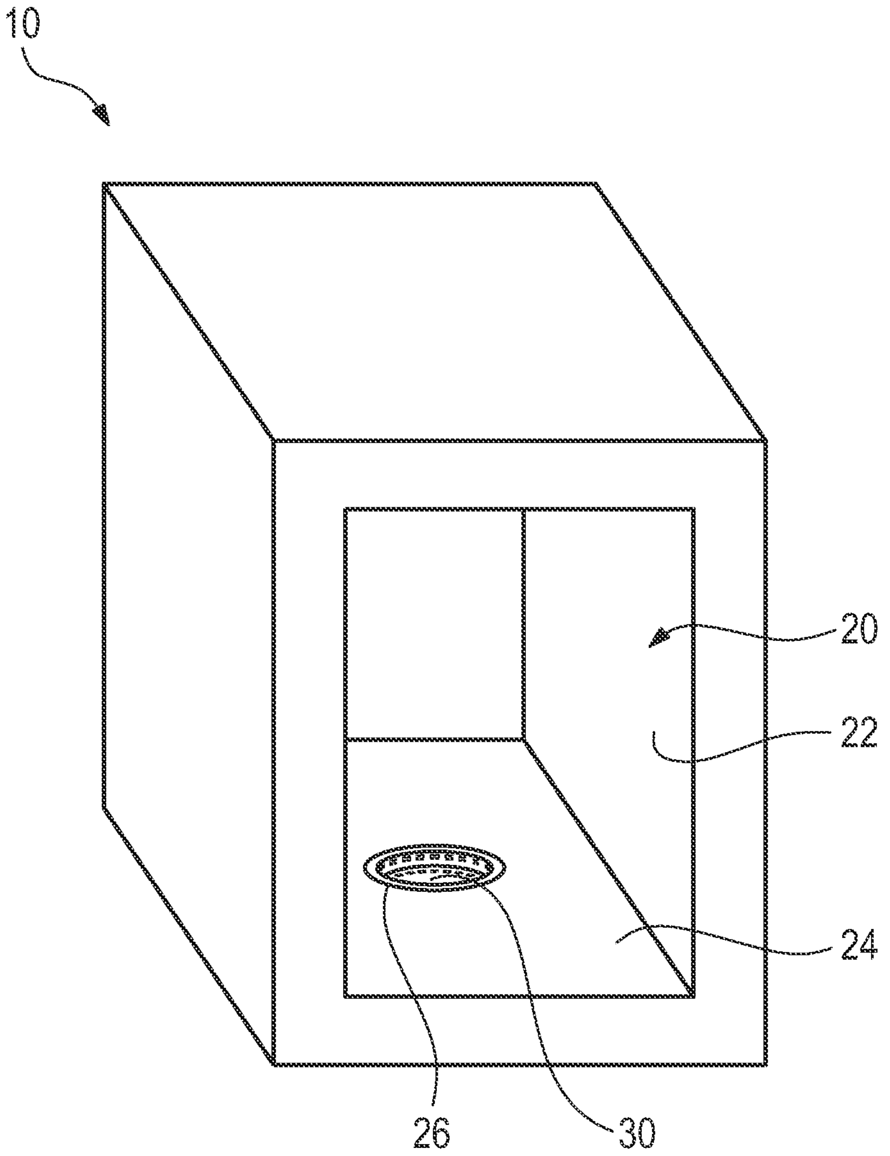
FIG. 1 shows a perspective view of a cooking device.

In FIG. 1, a cooking device 10 is shown schematically.

The cooking device 10 has a cooking chamber 20, which is formed by a cooking chamber wall 22 and can be closed by means of a cooking chamber door. To improve clarity, a representation of the door has been omitted in FIG. 1.

The cooking chamber wall 22 has a cooking chamber bottom 24, in which a through opening 26 is provided.

A cooking chamber sieve 30 is associated with the through opening 26, which is detachably locked in the through opening 26 of the cooking chamber bottom 24 and can be detached from the through opening 26 in a non-destructive manner, in particular to clean the cooking chamber sieve 30.

The cooking chamber sieve 30 performs the function of separating solids from liquids. The term "sieve" is not to be understood restrictively at this point and is used as a generic term for sieves, grids or also filters. Thus, this term refers to all components that perform the function of separation due to their mesh or pore size.

Figure 2:
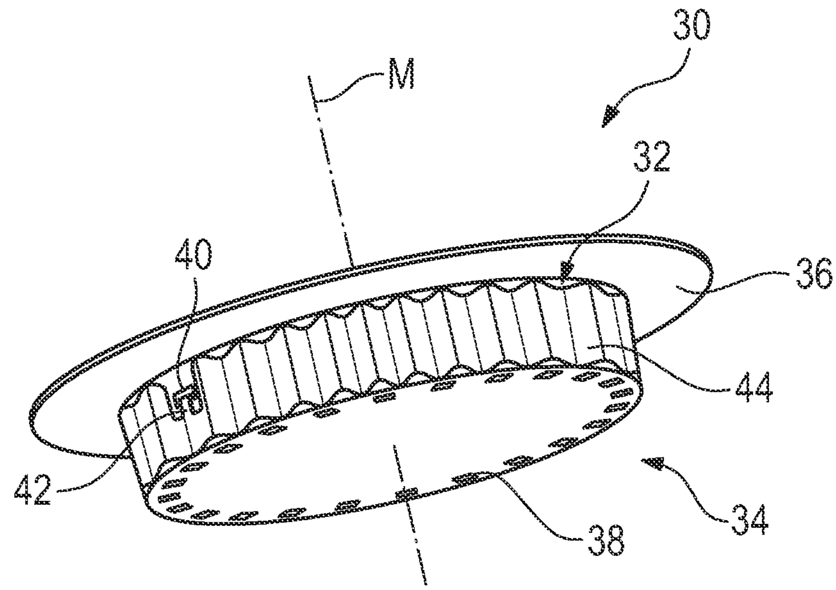
FIG. 2 shows a perspective view of a cooking chamber sieve according to a first variant.

FIG. 2 shows the cooking chamber sieve 30 and an intermediate element 32 according to a first variant. The cooking chamber sieve 30 has a pan- or cup-shaped sieve section 34 and a collar 36. The collar 36 extends in a wreath shape around the upper end of the sidewall of the sieve section 34. The sieve section 34 includes openings 38 in both the bottom portion and the sidewall, which perform the functions of separation and prevent larger dirt particles from entering the drainage system.

The collar 36 helps to collect larger dirt particles which accumulate on the cooking chamber bottom 24 outside the cup- or pan-shaped sieve section 34, so that the majority of all dirt particles around the cooking chamber sieve 30 accumulate on the outside of the sidewall of the sieve section 34 and the openings 38 in the bottom area are not blocked by the coarse dirt particles. The liquids produced during the cooking process flow into the drainage system as soon as the level reaches the openings 38 located in the sidewall or the upper edge of the collar 36, or as long as the spaces between the dirt particles allow drainage along the bottom of the cooking chamber. In addition, the collar 36 may serve to support the intermediate element 32 in the axial direction. Furthermore, the collar 36 provides a good grip due to its shape, which facilitates assembly and disassembly of the cooking chamber sieve 30.

The sidewall of the sieve section 34 is provided with a plurality of recesses 40.

The recesses 40 provide an attachment means for mounting the intermediate element 32.

The intermediate element 32 serves to provide the previously described non-destructively detachable connection between the cooking chamber sieve 30 and the through opening 26 of the cooking chamber bottom 24.

The intermediate element 32 is arranged on the exterior side of the sidewall of the sieve section 34 below the collar 36 and extends completely along the sidewall so that there is a planar contact between the intermediate element 32 and the sidewall.

For locking the intermediate element 32 to the cooking chamber sieve 30, the latter includes an attachment means 42 on the side facing the sieve section 34, which is held in the recesses 40. According to a first variant, the attachment means 42 is formed in a hook-shape and engages in the recesses 40, thus creating a positive connection. However, it is also conceivable to configure the cooking chamber sieve 30 without the recesses 40 and to lock the intermediate element 32 on the cooking chamber sieve 30 by means of a frictional connection.

To be able to produce a non-destructively detachable connection between the cooking chamber sieve 30 and the cooking chamber wall 22, the intermediate element 32 is configured as a spring element 44 on the side facing the cooking chamber wall 22 in accordance with a first variant. In this way, the intermediate element 32 can produce a non-positive connection by radial tensioning between the cooking chamber wall 22 and the cooking chamber sieve 30.

The pressing-in and holding force required to lock or release the cooking chamber sieve 30 in the through opening 26 is defined based on the design of the spring element 44.

Meander springs and/or disk springs are particularly suitable as spring element 44, but other types of springs are also conceivable. When meander springs are used, the openings between the meander spring and the through opening 26, if possible, should be smaller than the openings 38 in the cooking chamber sieve 30. Alternatively, the spring can additionally also be covered with a sleeve, which closes the openings.

Figure 3:
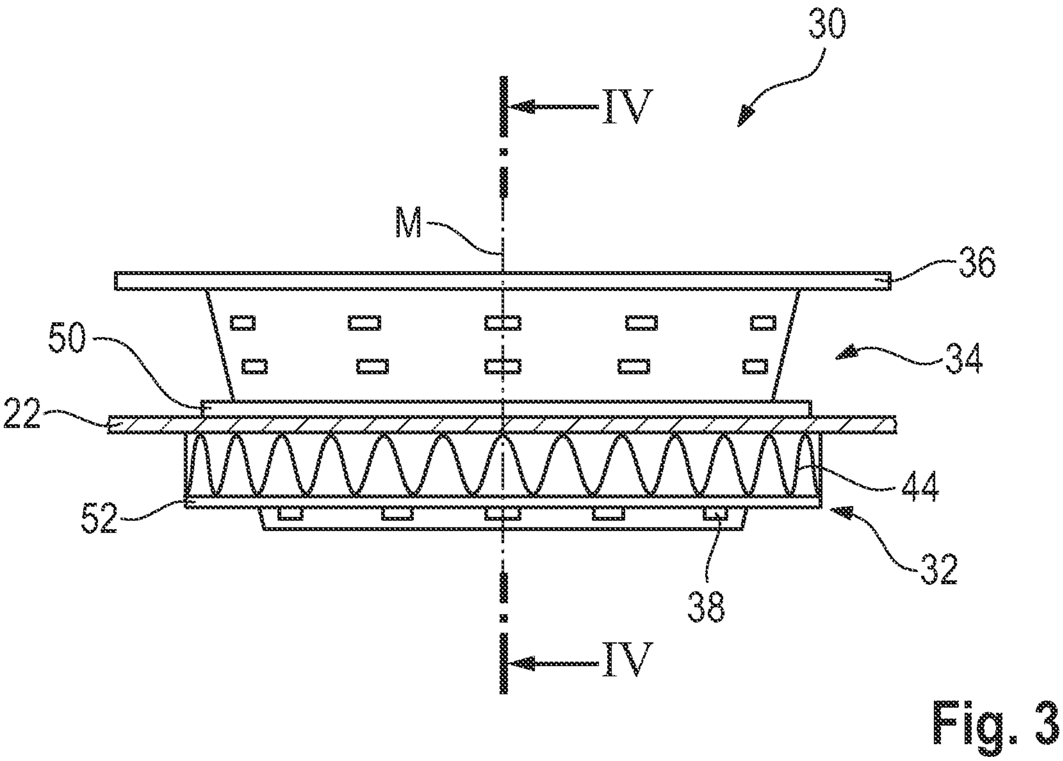
FIG. 3 shows a side view of a cooking chamber sieve according to an alternative to the first variant.
Figure 4:
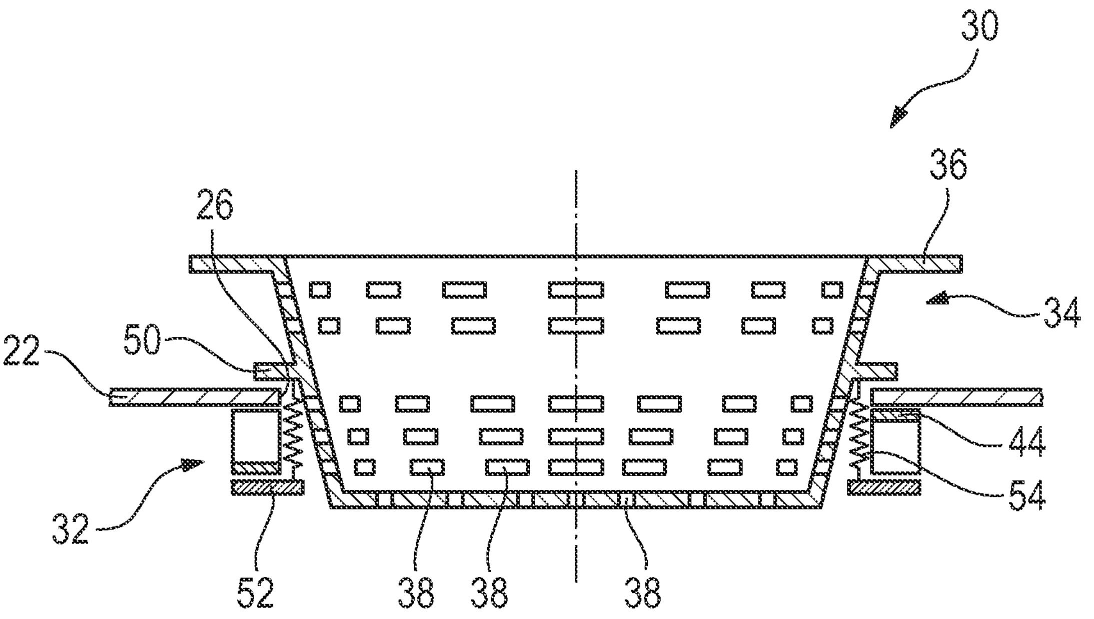
FIG. 4 shows a section along the plane IV-IV of FIG. 3.

FIGS. 3 and 4 show a further variant for the use of an intermediate element 32 configured with a spring element 44.

In this variant, the cooking chamber sieve 30 has a circumferential abutment 50 which acts as an axial stop along the central axis M. The abutment 50 can be configured in one piece with the cooking chamber sieve 30, but it is also conceivable that it is locked in the recesses 40.

The abutment 50 lies in a planar manner on the cooking chamber wall 22. The spring element 44 is arranged on the opposite side of the cooking chamber wall 22 and is compressed in the axial direction between the cooking chamber wall 22 and a clamping plate 52 by means of a clamping element 54. A spring or a screw, for example, can be used as the clamping element 54. In this variant, the use of a wave spring is suitable as the spring element 44.

To prevent the generation of electric arcs between the cooking chamber sieve 30 and the cooking chamber wall 22, electrically conductive materials are used for the previously described variants of the intermediate element 32 which are configured with a spring element 44, to ensure a potential equalization between the cooking chamber sieve 30 and the cooking chamber wall 22. Thus, these variants are based on the principle of electrical contacting. Both the intermediate element 32 and the spring element 44 are therefore preferably made of metal with good electrical conductivity.

The spring element 44 ensures constant electrical contact between the cooking chamber sieve 30 and the cooking chamber wall 22, which is compensated even in the event of a deviation in the dimensional accuracy of the components resulting from manufacturing tolerances or thermally induced component deformations. For example, a spring steel can be used for the spring element 44.

Furthermore, the intermediate element 32 and the spring element 44 easily withstand the temperatures prevailing in cooking chambers.

Optionally, it would be conceivable to manufacture the spring element 44 from any material and then sheathe it with an electrical insulator to prevent the generation of electric arcs by an electrical insulation.

Figure 5:
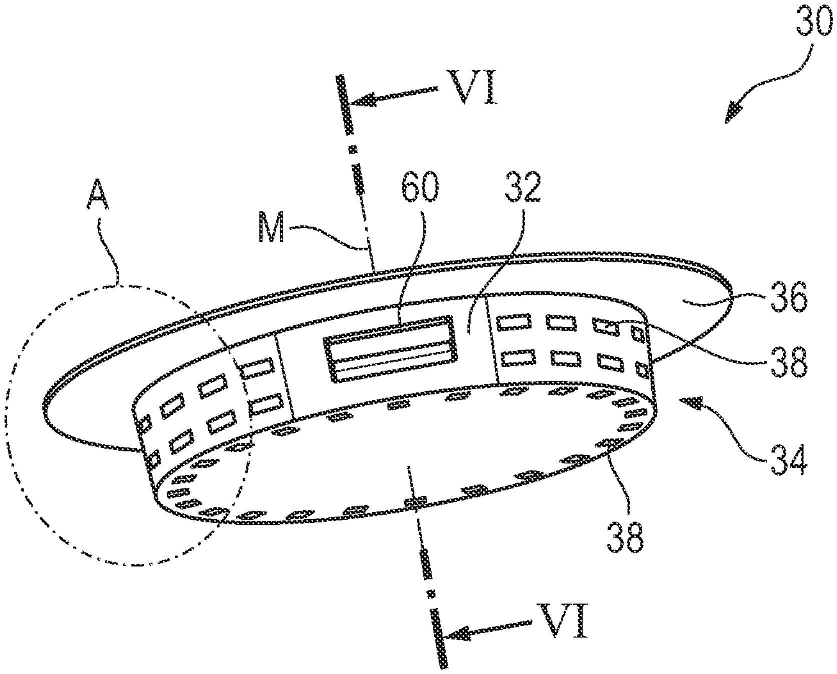
FIG. 5 shows a perspective view of a cooking chamber sieve according to a second variant.
Figure 6:
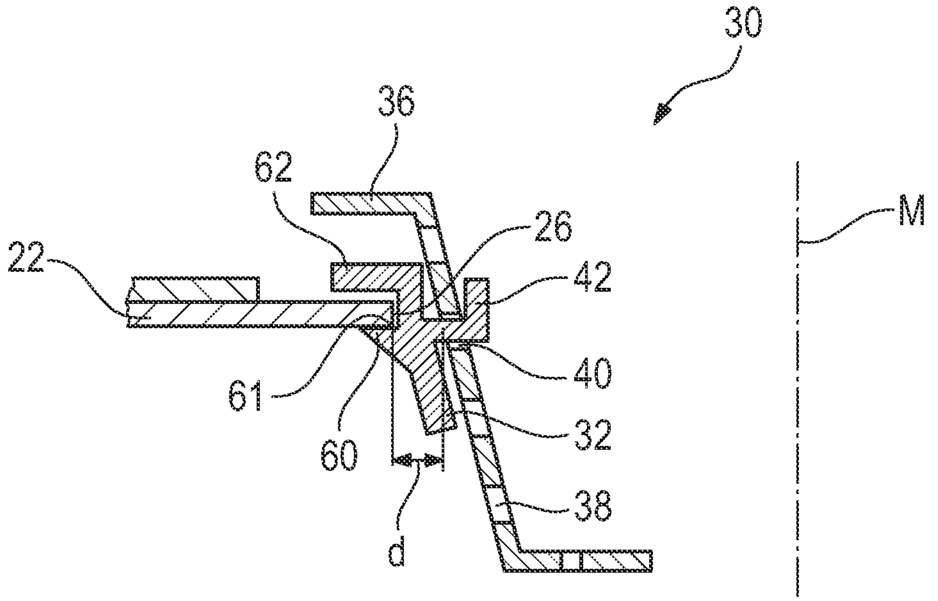
FIG. 6 shows the detail A of FIG. 5 as a section along the plane VI-VI according to the second variant.

FIGS. 5 and 6 show a second variant of the cooking chamber sieve 30. In contrast to the first variant, a plurality of intermediate elements 32 are arranged on the exterior side of the sidewall of the sieve section 34 in the second variant. In the areas of the sidewall of the sieve section 34 on which no intermediate element 32 is arranged, there is an air gap between the sidewall and the through opening 26. The dimensions of this air gap are in a size ratio similar to the openings 38 manufactured in the cooking chamber sieve 30, so that the sieving effect is still maintained. Alternatively, the plurality of intermediate elements 32 may be arranged such that the end faces of the ends are in an abutting relationship and no air gap is formed.

The intermediate element 32 is thus arranged between the cooking chamber sieve 30 and the cooking chamber wall 22. Therefore, there is no direct contact between the cooking chamber sieve 30 and the through opening 26. The thickness d of the intermediate element 32 defines the minimum distance between the cooking chamber sieve 30 and the cooking chamber wall 22.

In addition, the intermediate element 32 in this variant has a latching means 60 which cooperates with the latching edge 61 on the through opening 26 and locks the cooking chamber sieve 30 in place with a positive fit. The intermediate element 32 includes an intermediate element stop 62 on the side of the cooking chamber wall 22 opposite the latching means 60. The intermediate element stop 62 limits the movement along the central axis M during assembly of the cooking chamber sieve 30. It can thus be ensured that the cooking chamber sieve 30 is locked in a defined position in the assembled state. On the basis of the latching means 60 of the intermediate element 32, it is possible to determine the force with which the cooking chamber sieve 30 must be pressed in for assembly, and the force required to release the cooking chamber sieve 30 again.

Figure 7:
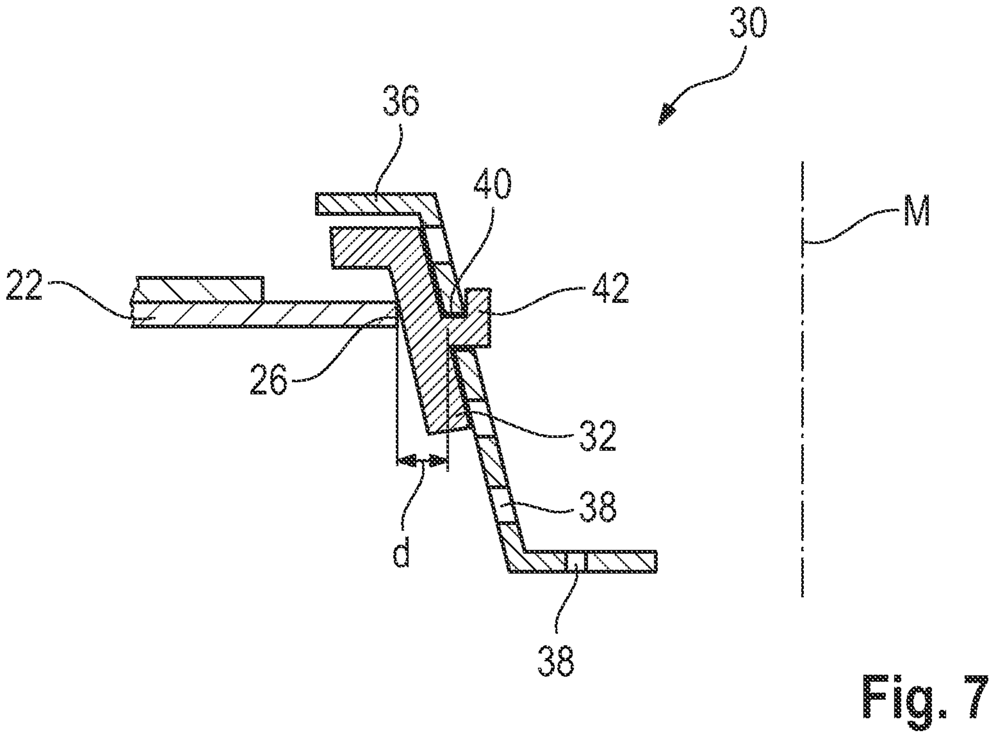
FIG. 7 shows the detail A of FIG. 5 as a section along the plane VI-VI according to an alternative to the second variant.

FIG. 7 shows an alternative to the second variant. In contrast to the second variant, the intermediate element 32 does not have any latching means. Instead, the intermediate element 32 has a slightly conical shape which allows the cooking chamber sieve 30 to be pressed into the through opening 26 and produces a frictional connection. In this alternative, the intermediate element 32 may be configured as a ring extending around the cooking chamber sieve 32 along the sidewall, leaving no air gap between the sidewall and the through opening 26.

FIGS. 8*a* to 8*i* show further variants of the attachment means 42 of the intermediate element 32. In all these variants, it is conceivable that the intermediate element 32 is arranged in the through opening 26 and the cooking chamber sieve 30 is held in the attachment means 42, or that the intermediate element 32 is locked in the through opening 26 along with the cooking chamber sieve 30. All subsequent intermediate elements 32, which are described as being half-ring-shaped, can only be used in combination with a further intermediate element 32. In this case, the ends thereof are configured such that they engage in each other with a positive fit and the end faces thereof lie on top of each other.

Figure 8A:
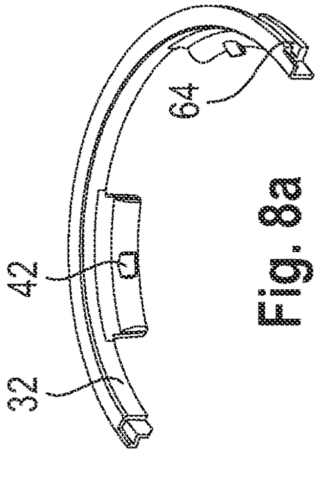
FIGS. 8*a* to 8*i* show perspective views of intermediate elements with attachment means according to different alternatives.

FIG. 8*a* shows an intermediate element 32 which is configured to have the shape of a half ring and has a plurality of attachment means 42 arranged on webs projecting in the axial direction, which are similar to a semicircular cylinder and extend in sections along the circumference on the inside towards the side facing the cooking chamber sieve 30, and on the cylinder outer surface of which a latching geometry is additionally arranged. Furthermore, the half-ring-shaped intermediate element 32 has a groove 64 along the circumference on the side facing the cooking chamber wall 22, which surrounds the cooking chamber wall 22 in the area of the through opening 26 in the assembled state.

Figure 8B:
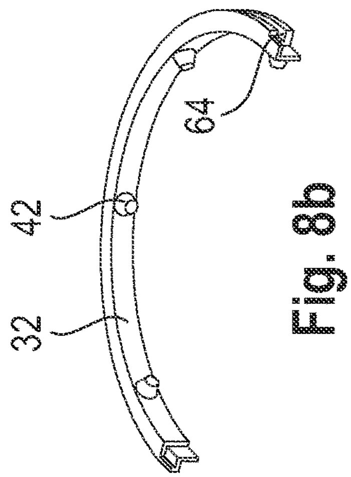

FIG. 8*b* shows a half-ring-shaped intermediate element 32, which is provided with a plurality of frustoconical attachment means 42 on the side facing the cooking chamber sieve 30. On the outer side, the intermediate element 32 also has the groove 64.

Figure 8C:
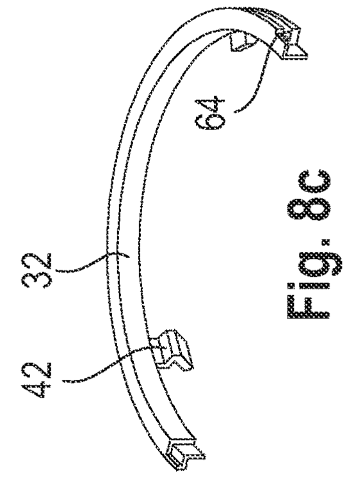

FIG. 8*c* shows a half-ring-shaped intermediate element 32, which has attachment means 42 arranged on webs projecting in the axial direction, the ends of the webs having a latching geometry. Analogous to the variants described above, this intermediate element 32 also has a groove 64.

Figure 8D:
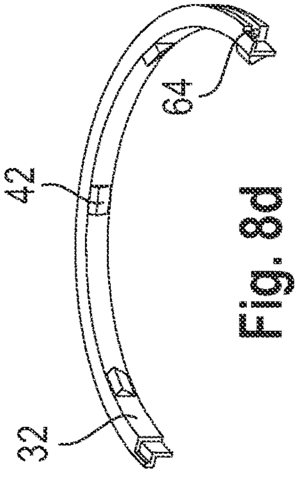

FIG. 8*d* shows a half-ring-shaped intermediate element 32, the attachment means 42 of which is configured in the form of a latching geometry. On the side facing the cooking chamber wall 22, this variant also has a groove 64.

Figure 8E:
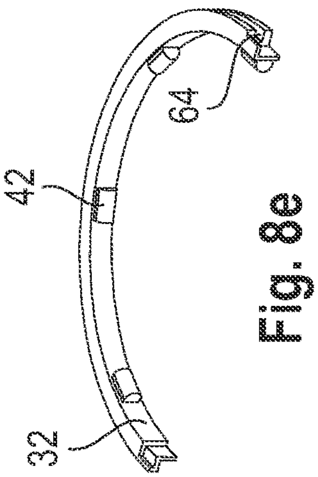

FIG. 8*e* shows a half-ring-shaped intermediate element 32, the attachment means 42 of which is in the form of a plurality of semicircular cylinders on the side facing the cooking chamber sieve 30. This variant also has a groove 64 on the outer side.

Figure 8F:
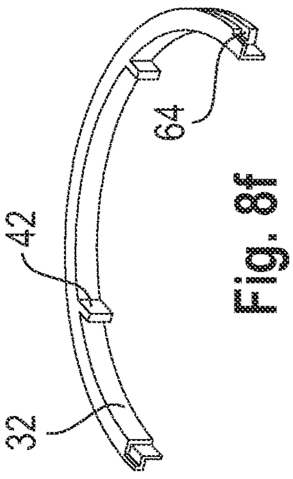

FIG. 8*f* shows a half-ring-shaped intermediate element 32, in which the attachment means 42 is configured in the form of webs extending parallel to each other and pointing from the inner side of the intermediate element 32 towards the open side of the half-ring.

Figure 8G:
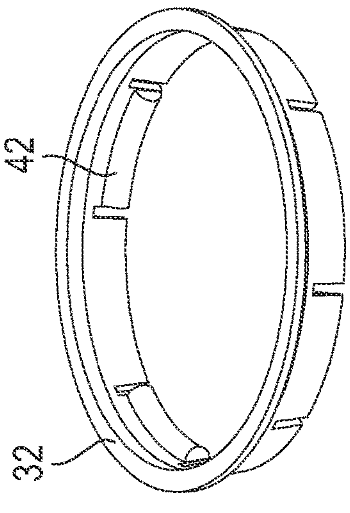

FIG. 8*g* shows a ring-shaped intermediate element 32 which has webs separated by longitudinal slots. Each second web has an attachment means 42 which projects in the form of semicircular cylinders on the side facing the cooking chamber sieve 30. The longitudinal slots allow a slight radial movement of the webs provided with the attachment means 42 when the intermediate element 32 is pushed onto the cooking chamber sieve 30. Unlike the previously mentioned variants, this variant does not have any groove on the exterior side. Thus, the locking in the through opening 26 is effected by a frictional connection. The wreath-shaped collar at the upper end of the intermediate element 32 can serve as an axial stop during pressing-in.

Figure 8H:
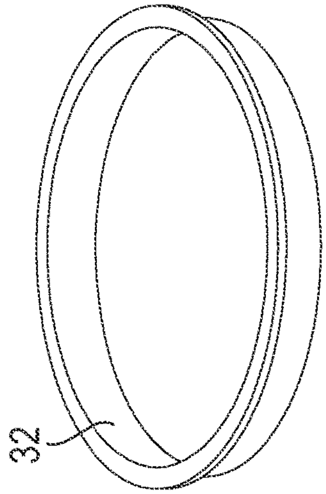

FIG. 8*h* shows an intermediate element 32 which has the shape of a thin-walled hollow cylinder provided with a wreath-shaped collar at the upper end. In this variant, both the locking of the intermediate element 32 on the cooking chamber sieve 30 and the locking of the cooking chamber sieve 30 by the intermediate element 32 in the through opening 26 are realized by a frictional connection. Furthermore, it is also conceivable that the cooking chamber sieve 30 along with the mounted intermediate elements 32 is only inserted into the through opening 26 and held in position by gravity.

Figure 8I:
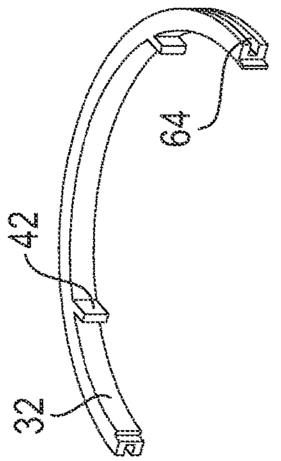

FIG. 8*i* shows a half-ring-shaped variant of the intermediate element 32 corresponding to that shown in FIG. 8*f*. The difference between the variants is that the end faces of the half-ring ends are configured in a step-shaped manner.

To prevent the generation of electric arcs between the cooking chamber sieve 30 and the cooking chamber wall 22, the second variant of the cooking chamber sieve 30 is based on the principle of electrical insulation.

Here, potential equalization between the cooking chamber sieve 30 and the cooking chamber wall 22 is to be prevented in that the intermediate element 32 acts as an electrical insulator between the components.

Depending on the variant embodiment, it is also possible, in addition to the intermediate element 32, to use the insulating properties of the air gap present between the cooking chamber sieve 30 and the cooking chamber wall 22 according to the second variant. In this case, the thickness d must be configured such that the insulating effect of the air gap is sufficient in any case to prevent the generation of electric arcs.

If the intermediate element(s) 32 fill(s) the area between the cooking chamber sieve 30 and the cooking chamber wall 22 and there is no air gap, as is provided according to the first variant, the thickness d of the intermediate element 32 can be determined exclusively in accordance with the insulating properties of the selected insulator, provided that the distance and thus the resistance between the cooking chamber wall 22 and the sieve section 34 or the collar 36 are of negligible size.

It is conceivable here to manufacture the intermediate element 32 from any material and then to sheathe it with an electrical insulator to obtain the desired insulating properties.

To influence the electric field in addition to an insulating effect, the intermediate element 32 can be made of a dielectric. In this way, the strength of the electric field can be reduced or the formation of the electric field can be prevented. It also counteracts the field strength increase at the edges of the components.

Nevertheless, it would be conceivable to manufacture the intermediate element 32 according to the second variant from an electrically conductive material and to prevent the formation of electric arcs by an electrical contacting.

The invention claimed is:

1. A cooking device comprising a microwave generator, a cooking chamber wall delimiting a cooking chamber, in which a through opening is provided, and a cooking chamber sieve associated with the through opening, wherein at least one intermediate element is provided between the cooking chamber wall and the cooking chamber sieve, which serves to mount the cooking chamber sieve to the cooking chamber wall, and wherein the at least one intermediate element is configured such that the generation of electric ares between the cooking chamber wall and the cooking chamber sieve is prevented.

2. The cooking device of claim 1, wherein the at least one intermediate element produces a non-destructively detachable connection between the cooking chamber sieve and the cooking chamber wall and/or the cooking chamber sieve along with the mounted intermediate elements is inserted into the through opening and gravity holds the cooking chamber sieve in position.

3. The cooking device of claim 1, wherein the at least one intermediate element is arranged on the side of the cooking chamber sieve facing the cooking chamber wall above a cooking chamber sieve collar and fills the area towards the cooking chamber wall.

4. The cooking device of claim 1, wherein at least two intermediate elements are arranged on the side of the cooking chamber sieve facing the cooking chamber wall above the cooking chamber sieve collar and an air gap remains between the cooking chamber sieve and the cooking chamber wall.

5. The cooking device of claim 1, wherein the at least one intermediate element is provided, on the side facing the cooking chamber sieve, with at least one attachment device configured to engage in a recess provided in the cooking chamber sieve and locks the intermediate element to the cooking chamber sieve.

6. The cooking device of claim 1, wherein the at least one intermediate element has, on the side facing the cooking chamber wall, at least one latching device configured to cooperate with a latching edge in the through opening of the cooking chamber wall, so that the cooking chamber sieve is positively locked.

7. The cooking device of claim 1, wherein the at least one intermediate element is configured as a spring element on the side facing the cooking chamber wall, so that the cooking chamber sieve is non-positively locked in the region of the through opening of the cooking chamber wall.

8. The cooking device of claim 1, wherein the at least one intermediate element is configured to be electrically conductive and establishes an electrical contact between the cooking chamber sieve and the cooking chamber wall.

9. The cooking device of claim 8, wherein the at least one intermediate element has a meander spring and/or disk spring made of metal.

10. The cooking device of claim 1, wherein the at least one intermediate element is an electrical insulator configured to prevent an electrical potential equalization between the cooking chamber sieve and the cooking chamber wall.

11. The cooking device of claim 10, wherein the at least one intermediate element is comprised of a dielectric material.

12. The cooking device of claim 10, wherein the cooking chamber sieve and the through opening of the cooking chamber wall are provided with radii to reduce an electric field strength increase at the component edges.

13. A cooking device comprising a microwave generator, a cooking chamber wall delimiting a cooking chamber, in which a through opening is provided, and a cooking chamber sieve associated with the through opening, wherein at least one intermediate element is provided between the cooking chamber wall and the cooking chamber sieve, which serves to mount the cooking chamber sieve to the cooking chamber wall, wherein the at least one intermediate element is configured such that the generation of electric arcs between the cooking chamber wall and the cooking chamber sieve is prevented, and wherein the at least one intermediate element has, on the side facing the cooking chamber wall, at least one latching device configured to cooperate with a latching edge in the through opening of the cooking chamber wall, so that the cooking chamber sieve is positively locked.

14. The cooking device of claim 13, wherein the at least one intermediate element produces a non-destructively detachable connection between the cooking chamber sieve and the cooking chamber wall and/or the cooking chamber sieve along with the mounted intermediate elements is inserted into the through opening and gravity holds the cooking chamber sieve in position.

15. The cooking device of claim 13, wherein the at least one intermediate element is arranged on the side of the cooking chamber sieve facing the cooking chamber wall above a cooking chamber sieve collar and fills the area towards the cooking chamber wall.

16. The cooking device of claim 13, wherein at least two intermediate elements are arranged on the side of the cooking chamber sieve facing the cooking chamber wall above the cooking chamber sieve collar and an air gap remains between the cooking chamber sieve and the cooking chamber wall.

17. The cooking device of claim 13, wherein the at least one intermediate element is provided, on the side facing the cooking chamber sieve, with at least one attachment device configured to engage in a recess provided in the cooking chamber sieve and locks the intermediate element to the cooking chamber sieve.

18. The cooking device of claim 13, wherein the at least one intermediate element is configured as a spring element on the side facing the cooking chamber wall, so that the cooking chamber sieve is non-positively locked in the region of the through opening of the cooking chamber wall.

19. The cooking device of claim 13, wherein the at least one intermediate element has a meander spring and/or disk spring made of metal.

20. A cooking device comprising a microwave generator, a cooking chamber wall delimiting a cooking chamber, in which a through opening is provided, and a cooking chamber sieve associated with the through opening, wherein at least one intermediate element is provided between the cooking chamber wall and the cooking chamber sieve, which serves to mount the cooking chamber sieve to the cooking chamber wall, and wherein the at least one intermediate element is configured such that the generation of electric arcs between the cooking chamber wall and the cooking chamber sieve is prevented, wherein the at least one intermediate element is configured to be electrically conductive and establishes an electrical contact between the cooking chamber sieve and the cooking chamber wall.

* * * * *